(12) United States Patent
Yin et al.

(10) Patent No.: US 6,490,251 B2
(45) Date of Patent: *Dec. 3, 2002

(54) METHOD AND APPARATUS FOR COMMUNICATING CONGESTION INFORMATION AMONG DIFFERENT PROTOCOL LAYERS BETWEEN NETWORKS

(75) Inventors: Nanying Yin, Newton, MA (US); Shantigram Jagannath, Cambridge, MA (US)

(73) Assignee: Nortel Networks Limited, St. Laurent (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/060,220

(22) Filed: Apr. 14, 1998

(65) Prior Publication Data

US 2001/0055313 A1 Dec. 27, 2001

Related U.S. Application Data

(60) Provisional application No. 60/042,993, filed on Apr. 14, 1997.

(51) Int. Cl.[7] ............................................... H04L 12/56
(52) U.S. Cl. ............................ 370/236.1; 370/395.2; 370/395.52; 370/466
(58) Field of Search ................................. 370/229, 230, 370/231, 232, 235, 236, 352, 353, 354, 389, 400, 401, 412, 465, 466, 467, 469, 230.1, 235.1, 236.1, 395.1, 395.2, 395.5, 395.51, 395.52; 709/230, 232, 234, 235

(56) References Cited

U.S. PATENT DOCUMENTS

| | | | | |
|---|---|---|---|---|
| 5,313,454 A | * | 5/1994 | Bustini et al. ................. | 370/13 |
| 5,748,901 A | * | 5/1998 | Afek et al. .................. | 370/229 |
| 5,802,106 A | * | 9/1998 | Packer ........................ | 375/225 |
| 5,940,369 A | * | 8/1999 | Bhagavath et al. .......... | 370/229 |
| 5,949,757 A | * | 9/1999 | Katoh et al. ................. | 370/232 |
| 5,995,486 A | * | 11/1999 | Iliadis ......................... | 370/229 |
| 6,038,216 A | * | 3/2000 | Packer ........................ | 370/231 |
| 6,046,980 A | * | 4/2000 | Packer ........................ | 370/230 |
| 6,046,983 A | * | 4/2000 | Hasegawa et al. ........... | 370/232 |
| 6,094,435 A | * | 7/2000 | Hoffman et al. ............. | 370/414 |

OTHER PUBLICATIONS

"The ATM Forum Technical Committee," Traffic Management Specification Version 4.0, af–tm–0056.000, Apr. 1996, 107 pages.

"Transmission Control Protocol," DARPA Internet Program Protocol Specification, RFC: 793, Sep. 1981, 62 pages.

* cited by examiner

*Primary Examiner*—Alpus H. Hsu
(74) *Attorney, Agent, or Firm*—Blakely Sokoloff Taylor & Zafman LLP (57) ABSTRACT

A method and apparatus for communicating congestion control information between dissimilar protocols operating in heterogeneous internetworks at different layers of the International Standards Organization (ISO) Open Systems Interconnection (OSI) 7 layer conceptual model for data networking. The method and apparatus provides direct end-to-end congestion control at the Transport layer across a TCP/IP and ATM internetwork utilizing ATM ABR and TCP sliding window flow control mechanisms. A network device that interconnects TCP/IP and ATM data networks for communication of data communicates network congestion detected by a protocol operating in the ATM data network to a heterogeneous protocol operating in the TCP/IP data network. The network device receives TCP data packets and stores them in a queue. A TCP packet is discarded if the queue is full or network congestion is detected by the protocol operating in the ATM network, to communicate network congestion in the ATM network to the heterogeneous protocol operating in the TCP/IP network.

45 Claims, 6 Drawing Sheets

METHOD AND APPARATUS FOR COMMUNICATING CONGESTION INFORMATION AMONG DIFFERENT PROTOCOL LAYERS BETWEEN NETWORKS

CROSS REFERENCE TO RELATED APPLICATIONS

This nonprovisional patent application claims the benefit of U.S. Provisional Application No. 60/042,993, filed Apr. 14, 1997, entitled, "METHOD AND APPARATUS FOR COMMUNICATING CONGESTION CONTROL INFORMATION BETWEEN THE TRANSPORT AND DATA LINK LAYERS OF A LAN AND ATM INTERNETWORK."

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of data networking. More specifically, the present invention is related to the communication of flow control information from one layer of a data internetwork to another layer of the data internetwork. In one embodiment, the present invention relays congestion control information provided by a protocol operating at the Data Link layer in a connection-oriented, packet switched network, e.g., an Asynchronous Transfer Mode (ATM) network, to a protocol operating at the Transport layer in a connectionless-oriented network, i.e., a non-ATM interconnected network, such as an Ethernet or Token Ring network that supports, e.g., the Transmission Control Protocol/Internet Protocol (TCP/IP) suite of protocols for nondeterministic (i.e., not guaranteed) transmission data.

2. Description of the Related Art

The ATM Forum is a consortium of vendors in the data and telecommunication industries that proposes recommendations and implementation specifications for Asynchronous Transfer Mode networks. The ATM Forum promulgates specifications for functions not addressed by the standards bodies, including Available Bit Rate (ABR) services for Local Area Networks (LANs), Unspecified Bit Rate (UBR) services, and ABR-based flow control. The ATM Forum has specified an Available Bit Rate (ABR) service and a rate-based flow control mechanism in the ATM Forum TM SWG Traffic Management Specification version 4.0, April, 1996. ABR is a service type that guarantees a minimum bit rate for data transmissions, formatted as fixed length data cells. Additionally, while ABR makes no guarantee a cell will be delivered, it does attempt to keep cell loss as low as possible. UBR is a best effort service type that provides no minimum bit rate guarantee for data transmission.

ABR is utilized by ATM applications to vary the rate of data cells transmitted by the ATM applications in the ATM network based on feedback, i.e., control information, provided by the network. Control information is sent to an ATM application, i.e., an ABR source, in Resource Management (RM) cells. Based on the information provided in the RM cells about the condition of the network, the ABR source varies the rate of data cells transmitted by the ABR source in the network. ABR service includes a flow control mechanism that provides a minimum amount of bandwidth to ABR compliant ATM applications, such as file transfer applications. With the ABR flow control mechanism, the data cell transmission rate of an ATM Virtual Circuit (VC) connection is controlled based on the network feedback information carried in the RM cells.

A RM cell contains information fields, including, at least: 1) a direction field indicating the direction of the RM cell, 2) a Congestion Indication (CI) bit field, and 3) an Explicit Rate (ER) field. The network initially sends a RM cell with the CI bit equal to zero and the ER field equal to the maximum cell rate. An ATM network component (e.g., a switch or ATM destination end-user system) may modify the CI bit and ER field of the RM cell to reflect the congestion experienced in the ATM network and availability of network resources. When the ATM source end-user system receives a RM cell from the destination end-user system, it adjusts its cell transmission rate accordingly, based on, for example, the ER and CI values. It is generally believed the ABR service effectively controls congestion within ATM networks in this manner. However, this method does not extend to congestion control across interconnected heterogeneous networks, such as an Ethernet or Token Ring Local Area Network (LAN), connected to an ATM network via, e.g., a switch or router.

Presently, little research on end-to-end traffic management in a heterogeneous internetworking environment has been done. For example, when non-ATM networks such as local area networks 110 and 120 shown in FIG. 1, e.g., Ethernet networks operating under the TCP/IP suite of protocols, are connected to an ATM network 130, ABR flow control may simply push any congestion to the edge of ATM network, i.e., to ATM intermediate systems 115 and 125 (e.g., ATM/LAN switches). Even if the ATM network effectively controls congestion therein using ABR flow control, the overall network performance (e.g., the time to transfer a file) provided to an application executing on a node, e.g., node 140, in the non-ATM network may not be necessarily better. Furthermore, it could be contended that reducing memory buffer requirements in an ATM switch (within ATM network 130) using ABR flow control may be at the expense of increasing memory buffer requirements at ATM edge devices (e.g., switches 115 and 125).

Most of today's data networking applications use Transport layer flow control protocols. The Transmission Control Protocol (TCP) is an example of a reliable connection-oriented Transport layer protocol operating above the Network (e.g., Internet Protocol (IP)) and Data Link layers. TCP flow control utilizes a variable sized window-, or sliding window-based flow control protocol. A sliding window at the source port of a TCP connection is adjusted based on the window size advertised by the destination port of the TCP connection and the successful transmission of each TCP packet being transmitted. As the window size advertised by the TCP destination port increases, the size of the sliding window at the TCP source port is increased. Conversely, as the window size advertised by the TCP destination port decreases, the size of the sliding window at the TCP source port is decreased. For example, if the TCP destination port receive buffer is full, the TCP destination port advertises a window size of zero. The TCP source port then stops sending data to the TCP destination port until it receives an advertisement from the TCP destination port indicating a nonzero window size. Additionally, when the network becomes congested, for example, when an intermediate system in the network becomes overloaded due to unavailable bandwidth or lack of buffer space, TCP packets may be dropped. This is detected by the TCP source and/or destination port by out of sequence TCP end-to-end flow control sequence and acknowledgement numbers. In such a situation, the TCP sliding window flow control mechanism functions as a congestion control mechanism, decreasing the sliding window size at the TCP source port.

Figure 1:
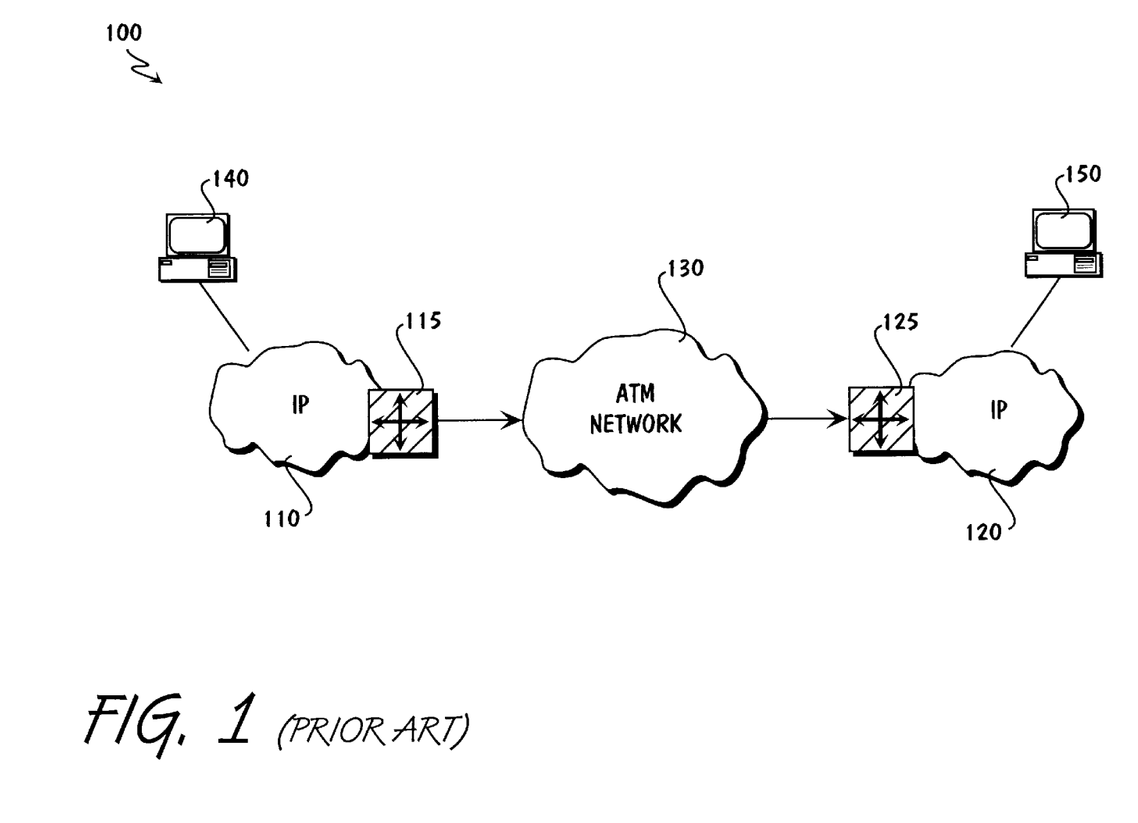
FIG. 1 is an illustration of an internetwork of local area and ATM networks.

In an internetworking environment, e.g., network 100, the TCP source and destination ports (at nodes 140 and 150 respectively) may be interconnected through heterogeneous networks such as the TCP/IP-based network 110, ATM network 130 and TCP/IP-based network 120 as shown in FIG. 1. The relationship between the TCP sliding window flow control and ATM ABR flow control is further illustrated in FIG. 2, wherein TCP/IP protocol stacks 210 and 220 are respectively operating at end user nodes 140 and 150, ATM over IP protocol stacks 230 and 250 are respectively operating at intermediate systems 115 and 125 (also referred to herein as source and destination edges devices because the systems are located at the "edge" of the ATM network), and ATM protocol stack 240 is operating over ATM network 130, for the internetworking environment 100 illustrated in FIG. 1. End user application(s), e.g., end user application 255, executes at the top of the TCP/IP protocol stack, e.g., TCP/IP protocol stack 210. With respect to FIGS. 1 and 2, data formatted as TCP packets are transmitted from node 140 through the TCP/IP-based network 110 to the source edge device 115. The TCP packets are variable in length, and generally have a length greater than the fixed-length 53 byte cells transmitted in an ATM network environment. Thus, the TCP packets are segmented into fixed length 53 byte ATM cells by IP over ATM protocol stack 230 (using, for example, the ATM Adaptation Layer 5 (AAL5) protocol) executing at the source edge device 115 for transmission over the ATM network 130. The ATM cells are then transmitted across the ATM network 130 via ATM protocol stack 240. The ATM cells are received and reassembled into TCP packets at the destination edge device 125 by IP over ATM protocol stack 250.

Figure 2:
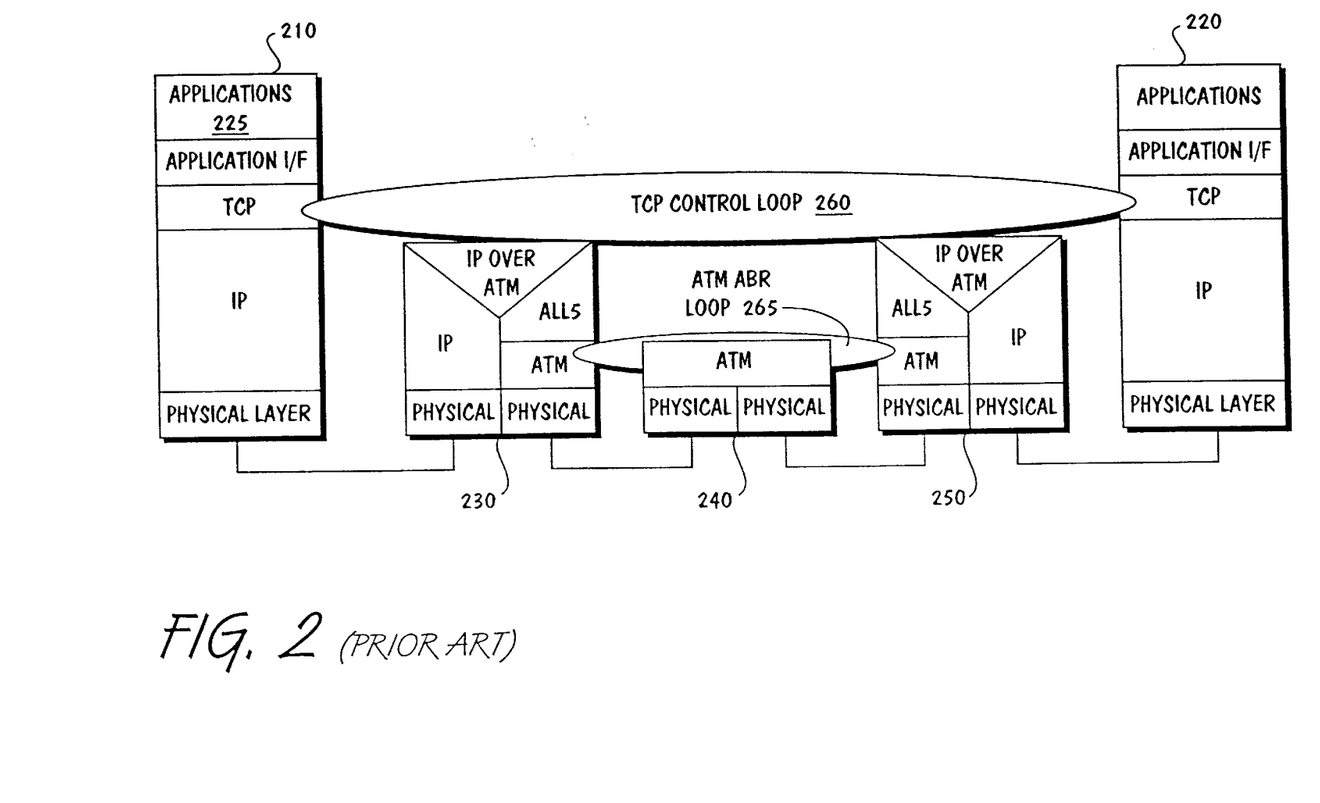
FIG. 2 is an illustration of the protocol stacks embodied by the end user and intermediate systems in the internetwork of FIG. 1.

As shown in FIG. 2, the TCP sliding window flow control mechanism operates at the Transport layer (e.g., TCP control loop 260) and the ABR flow control mechanism operates at the Data Link layer (e.g., ATM control loop 265). In the prior art, there is no direct communication between the aforesaid TCP sliding window flow control mechanism and the ATM ABR flow control mechanism. When congestion is detected in the ATM network, ABR flow control reduces the data cell transmission rate in the ATM network. If congestion persists, memory buffers present in the ATM network may reach capacity, and/or ATM network bandwidth may become unavailable, causing TCP packets to be dropped, eventually resulting in a reduction of the TCP sliding window at the TCP source port in the sending node. Loss of multiple TCP packets within the same TCP window may result in significant reduction of TCP packet throughput. Using larger buffers at the edge devices 115 and/or 125 may reduce the loss of TCP packets and increase the TCP packet throughput, but it may significantly increase the cost of the edge devices. Moreover, the requirement for larger buffers may be beyond the practical limitations of an edge device.

From a performance point of view, there are two control loops in the network illustrated in FIGS. 1 and 2: ABR rate-based flow control at control loop 265 and TCP sliding window flow control (providing congestion control when TCP packets are dropped) at control loop 260. The ABR control loop 265, operating essentially as an inner loop to the TCP control loop 260, may result in a longer feedback delay for the TCP control loop. Furthermore, there are two feedback control protocols, and the interactions or interference between the two may actually degrade the Transport layer performance, depending on the TCP implementation.

Thus, what is needed is a mechanism at the ATM edge device that provides for direct communication between the TCP and ABR flow control mechanisms to resolve the above problems.

BRIEF SUMMARY OF THE INVENTION

The present invention provides a method and apparatus for congestion control by communicating information between different protocols operating at different layers of the International Standards Organization (ISO) Open Systems Interconnection (OSI) 7 layer conceptual model across heterogeneous interconnected networks. Generally, network congestion, detected by a first protocol operating in a first network, is communicated to a second protocol operating in a second network. The first protocol discards a data packet received from the second network if the first protocol operating in the first network detects a transition to a state of network congestion or a continued state of network congestion in the first network. In one embodiment, a network device, such as a switch or router, that interconnects TCP/IP and ATM data networks for communication of data between nodes connected to the networks, communicates network congestion detected by a protocol operating in a ATM data network, e.g., a Data link layer protocol, to a heterogeneous protocol operating in the TCP/IP data network, e.g., TCP. The network device receives TCP data packets and stores them in a queue. The oldest TCP packet is discarded when the queue is full or network congestion is detected by the Data Link layer protocol in the ATM network, to communicate network congestion in the ATM network to the Transport layer in the TCP/IP network. The TCP window size is estimated and only one TCP packet is allowed to be discarded in each TCP window, unless the queue is full.

BRIEF DESCRIPTION OF THE SEVERAL VIEWS OF THE DRAWINGS

The present invention is illustrated by way of example and not limitation in the following figures. Like references indicate similar elements, in which.

DETAILED DESCRIPTION OF THE INVENTION

The present invention provides a method and apparatus for communicating congestion control information between different protocols at different layers of the International Standards Organization (ISO) Open Systems Interconnection (OSI) 7 layer conceptual model for data networking across heterogeneous networks. In the following description, numerous specific details are set forth in order to provide a thorough understanding of the present invention. It will be apparent, however, to one of ordinary skill in the art that the present invention may be practiced without these specific details. In other instances, well-known architectures, circuits, and techniques have not been shown to avoid unnecessarily obscuring the present invention.

In alternative embodiments, the present invention may be applicable to implementations of the invention in integrated circuits or chip sets, wireless implementations, switching systems products and transmission systems products. For purposes of this application, the terms switching systems products shall be taken to mean private branch exchanges (PBXs), central office switching systems that interconnect subscribers, toll/tandem switching systems for interconnecting trunks between switching centers, and broadband core switches found at the center of a service provider's network that may be fed by broadband edge switches or access multiplexers, and associated signaling, and support systems and services. The term transmission systems products shall be taken to mean products used by service providers to provide interconnection between their subscribers and their networks such as loop systems, and which provide multiplexing, aggregation and transport between a service provider's switching systems across the wide area, and associated signaling and support systems and services.

Figure 3:
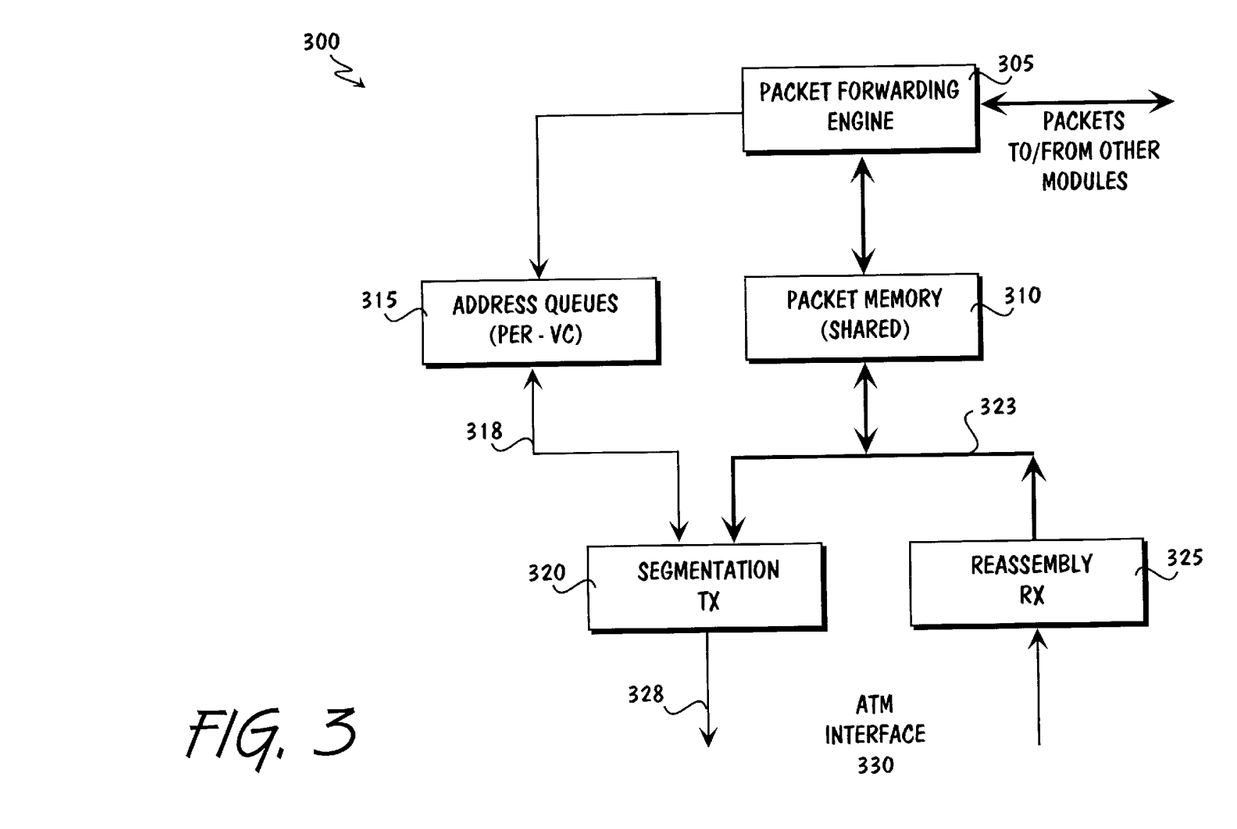
FIG. 3 is a block diagram of an ATM interface as may be embodied by the present invention.

With reference to FIG. 3, a block diagram of an ATM interface and related components as may be embodied by an edge device, for example, edge device 115 executing under the control of protocol stack 230, is illustrated. TCP packets received by the edge device, e.g., from a node in TCP/IP-based network 110, to be sent through ATM interface 330 and over ATM network 130, are forwarded by packet forwarding engine 305 to a packet memory 310. The address of a memory location at which a TCP packet is stored in packet memory 310 is queued on a per Virtual Circuit (per-VC) address queue 315, or simply, address queue 315, for later ATM cell segmentation and ATM network transmission. (It should be noted that when the memory address at which a TCP packet is stored is placed on the per VC address queue, the packet stored at that address is considered herein to "be queued" or to be placed on "the queue" for subsequent transmission over the ATM network 130.) When the ATM segmentation/transmitter (Tx) 320 is ready to segment a TCP packet, it checks with address queue 315 to find out the location of the TCP packet in the packet memory 310. The ATM segmentation/transmitter 320 reads data from packet memory 310 at the address specified by address queue 315, segments the data into fixed length data cells and prepends each data cell with an ATM cell header. The data cells are then transmitted through ATM interface 330 to ATM network 130. On the receiving side, fixed length data cells received at ATM reassembly/receiver 325 are reassembled into variable length data packets. The data are stored in the packet memory 310 and then sent up the protocol stack by the packet forwarding engine 305, where the data are encapsulated by the appropriate headers at each layer, e.g., formatted as TCP/IP packets, and transmitted over a TCP/IP-based network.

Figure 4:
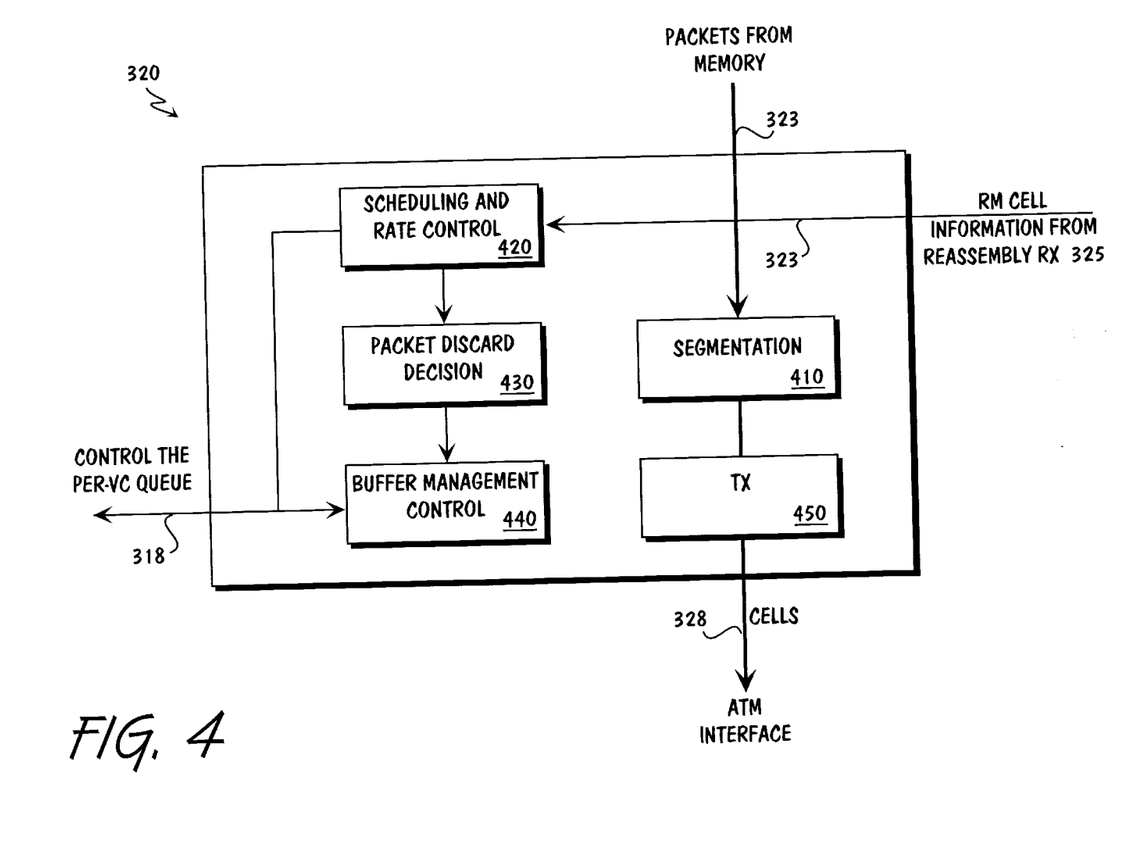
FIG. 4 is a block diagram of a portion of an ATM interface as may be embodied by the present invention.

FIG. 4 describes the functions within the ATM segmentation/transmitter 320 in more detail. The segmentation/transmitter 320 segments data at segmentation block 410, schedules cell transmissions and controls the cell transmission rate at scheduling and rate control block 420, decides what packets to discard at packet discard decision block 430, and manages buffers at buffer management control block 440. When an ATM Resource Management (RM) cell is received from the ATM network at ATM reassembly/receiver 325, it is passed to the ATM segmentation/transmitter 320 via internal bus 323. The rate controller in block 420 adjusts the rate at which cells are transmitted over a Virtual Circuit (VC) associated with the RM cell, and the scheduler in block 420 schedules the service time of the VC service time accordingly. The buffer management control block 440 manages the shared packet memory 310 based on the size or length of the per VC address queue and overall buffer usage. The packet discard decision block 430 decides when to drop a packet to be transmitted over the ATM network based on the ATM network feedback information carried in RM cells received from the ATM network and per VC buffer usage, as further described in detail below.

Figure 5:
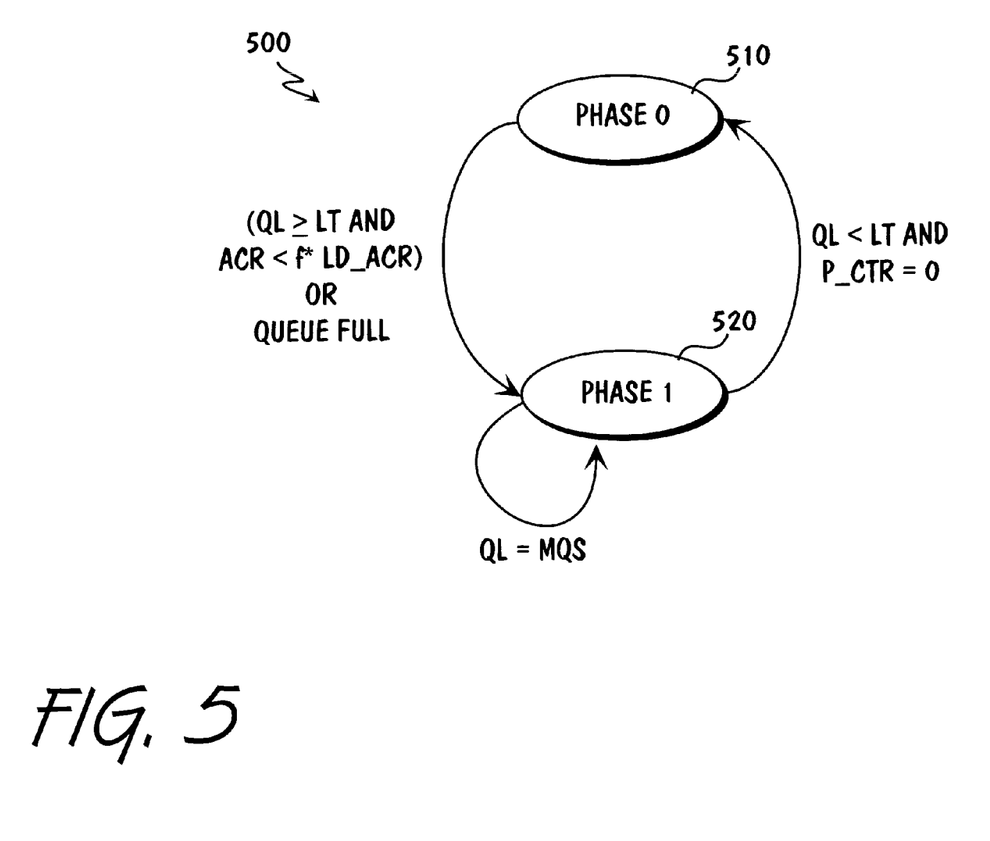
FIG. 5 is a state diagram of an embodiment of the present invention, in particular, a state diagram for the static threshold algorithm implemented by decision block 430 in FIG. 4.

The packet discard decision block 430 couples ABR flow control with TCP sliding window flow control. The packet discard decision block relieves congestion as well as conveys congestion information to the TCP source port of a TCP connection as soon as possible. In addition, the packet discard decision block takes into consideration the manner in which the TCP source port recovers from a lost or dropped TCP data packet to prevent a significant loss of throughput. FIG. 5 provides a state diagram 500 for an algorithm implemented by packet discard decision block 430 in one embodiment of the present invention. The accompanying pseudo-code describes the algorithm in more detail.

Static Threshold Algorithm

Variables:

ACR=current Available Cell Rate, i.e., current cell transmission rate.

CI=Congestion Indication in ATM network as determined from received RM cell.

Congestion Phase=a bit providing information on the phase of the congestion (set to 0 or 1).

ER=maximum network allowed cell transmission rate as determined from a received RM cell, in particular, based on the value of the Explicit Rate bit therein; ER is the ceiling for ACR.

f=Factor that determines the significance in rate reduction; wherein 0<f<1, and f typically equals 0.5.

LD_ACR=ACR when a packet is dropped (Last Dropped ACR), or when ACR is increased; LD_ACR is always greater than or equal to ACR.

LT=Low Queue Threshold; minimum number of packets in the queue, as a percentage of MQS, typically ranging from 30 to 50 percent.

MQS=Maximum Queue Size, e.g., in terms of maximum number of packets in the queue.

P_CTR=the number of packets in the queue when a packet is dropped; P_CTR is decremented each time a packet is serviced, i.e., read from the queue.

QL=Queue Length in terms of number of packets in the queue.

```
Initialize:
    LD_ACR = ACR;
    Congestion Phase = 0;
    Set values for LT, MQS
When receiving an RM cell {
    Update ACR value based on ER and CI information
}
if (Congestion Phase = 0) {
    if((ACR < f * LD_ACR or CI=1) and
        QL >= LT) or (QL = MQS){
        Drop TCP packet from front of Queue;
        Congestion Phase = 1;
        LD_ACR = ACR;
        P_CTR = QL;
    }
    if (ACR > LD_ACR) {
        LD_ACR = ACR;
    }
}
if (Congestion Phase = 1){
    if(QL = MQS){
        Drop TCP packet from front of Queue;
        LD_ACR = ACR;
        P_CTR = QL;
    }
    if(QL < LT and P_CTR=0) {
        Congestion Phase = 0;
    }
    Decrement P_CTR when a TCP packet is serviced;
    P_CTR = Max (P_CTR, 0);
}
```

On receipt of RM cells and the feedback information, i.e., ER and CI values, contained therein, appropriate changes are made to the value of ACR for the particular VC in the ATM network. When the value of ACR is reduced significantly, this information is conveyed to the TCP source port in the Transport layer connection as soon as possible by dropping a TCP packet. An embodiment of the present invention uses this feedback information and the current queue length (QL) information to decide if a TCP packet should be dropped from the VC. Every time a TCP packet is dropped, the method of the present invention updates the LD_ACR (Last Drop ACR) value and uses that as the reference rate against which to compare a new ACR value. The value of LD_ACR is set to the value of ACR whenever the value of ACR is larger than the current value of LD_AR. Thus, the value of LD_ACR is always greater than or equal to the value of ACR.

The static threshold algorithm embodied by the present invention comprises two phases, as indicated in the state diagram 500 of FIG. 5. The criteria used to effect dropping a TCP packet is different for the two phases, termed phase 0 (at 510) and phase 1 (at 520) herein:

Phase 0
  The ATM network is not considered to be congested in this phase, as is reflected both by an ACR value that is slowly changing and a queue length (QL) value less than the maximum queue size (MQS) value. Two possible scenarios cause a packet to be dropped. In the first scenario, if the value of ACR is constant or slowly changing, eventually the TCP sliding window and hence the input rate of TCP packet transmissions to the queue may become large enough to cause the queue length (QL) value to reach MQS. In such case, a TCP packet is dropped by packet discard and decision block 430 to trigger a reduction in the size of the TCP sliding window at the TCP source port in the Transport layer connection. In the second scenario, a TCP packet is dropped when there is a significant reduction in the ER available to the VC, if the queue length (QL) is greater than the low queue threshold (LT). The low queue threshold should be set to a number allowing for at least a few TCP packets to be transmitted to ensure the transmission of duplicated TCP acknowledgments, and should not be set too close to the maximum queue size (MQS) for the queue to ensure proper congestion avoidance functionality.

A significant reduction in the ACR value (caused by a reduction in ER—the ceiling for ACR) signifies congestion in the ATM network, in which case, the present invention sends an early warning to the TCP source port by dropping a TCP packet. In both the above cases, the TCP packet is dropped from the front of the queue, i.e., the oldest TCP packet in the queue is discarded. This results in early triggering of the congestion control mechanism in TCP as provided by the TCP sliding window flow control mechanism when a TCP packet is dropped. Additionally, the TCP sliding window flow control mechanism aligns the start of the sliding window to the dropped TCP packet and remains unchanged until that TCP packet is successfully retransmitted, thereby reducing the amount of data that the TCP source port pumps into a congested ATM network. In implementations of TCP providing for the well known fast recovery and retransmit options, the recovery from the dropped TCP packet occurs sooner than implementations without fast recovery and fast retransmit options because at least one buffer of data is transmitted after the dropped TCP packet (which in turn generates the required duplicate TCP acknowledgments for the fast retransmit or recovery procedures).

Transition to phase 1: when the TCP source port detects a lost or dropped TCP packet, depending on the implementation of TCP, the sliding window is either reduced to one packet, or to one half the current window size. When multiple TCP packets are lost within the same TCP sliding window, different TCP implementations recover differently, as set forth below:

TCP without Fast Retransmit and Fast Recovery: TCP recovers all lost TCP packets using transmission time-outs. Thus, for every lost TCP packet, the TCP source port times out before retransmitting. Considering the large timer values of current TCP implementations, not only does a dropped packet cause a reduction in TCP packet transmission rate, but an under-utilization of network bandwidth because TCP takes very long to recover. The first dropped TCP packet effects the TCP rate slow down, after one round trip time (about one window worth of data later). Understandably, it is not desirable to drop multiple TCP packets within the same TCP sliding window and should be avoided if possible.

TCP with Fast Retransmit, but no Fast Recovery: TCP recovers from the first TCP packet loss using fast retransmit (triggered by duplicate TCP acknowledgements), but the subsequent TCP packet losses are only recovered by a TCP transmission time-out. TCP determines that a packet is lost sooner than implementations without fast retransmit and fast recovery, and responds by reducing the TCP sliding window for the TCP source port to one TCP packet. The subsequent losses within the same sliding window are mostly recovered by time-out causing degradation in the TCP throughput.

TCP with Fast Retransmit and Fast Recovery: TCP recovers from the first lost TCP packet when three duplicate acknowledgments for the lost TCP packet are received. Unlike the previous implementation, however, this implementation reduces the TCP sliding window to half its current size, effectively reducing the TCP packet transmission rate to half its current value. Subsequent TCP packet losses within the same sliding window may be recovered by the same process of duplicate TCP acknowledgments or by TCP transmission time-out, in either case, causing a degradation of throughput.

The first TCP packet dropped causes the reduction in the TCP source port sliding window and hence the average TCP packet transmission rate. Multiple TCP packet losses within the same TCP sliding window cause a degradation of throughput and are not desirable, irrespective of the TCP implementation. Thus, after the first TCP packet is dropped, the algorithm transitions to phase 1.

Phase 1

In phase 1, i.e., when congestion is considered present in the ATM network, the present method does not drop TCP packets to convey a reduction in the ACR. Instead, TCP packets are dropped only when the queue length reaches the MQS value. The TCP packets are dropped from the front of the queue for the same reasons discussed above with respect to phase 0. When a TCP packet is dropped, an embodiment of the present invention records the number of packets in the queue in the variable P_CTR. The TCP sliding window size is at least as large as P_CTR when a TCP packet is dropped, thereby avoiding dropping any more TCP packets due to rate reduction until P_CTR packets are serviced.

Transition to Phase 0: if the ACR stays at the value that caused the transition to phase 1, i.e., the congestion still exists, the queue length decreases after one round trip time and the algorithm transitions to phase 0. If the ACR decreases further, then the queue length increases and the method eventually drops another TCP packet if the queue length reaches the MQS value, but does not transition back to phase 0. The transition to phase 0 occurs when at least P_CTR TCP packets have been serviced and the queue length falls below the value for low queue threshold (LT).

Dynamic Threshold Algorithm

Figure 6:
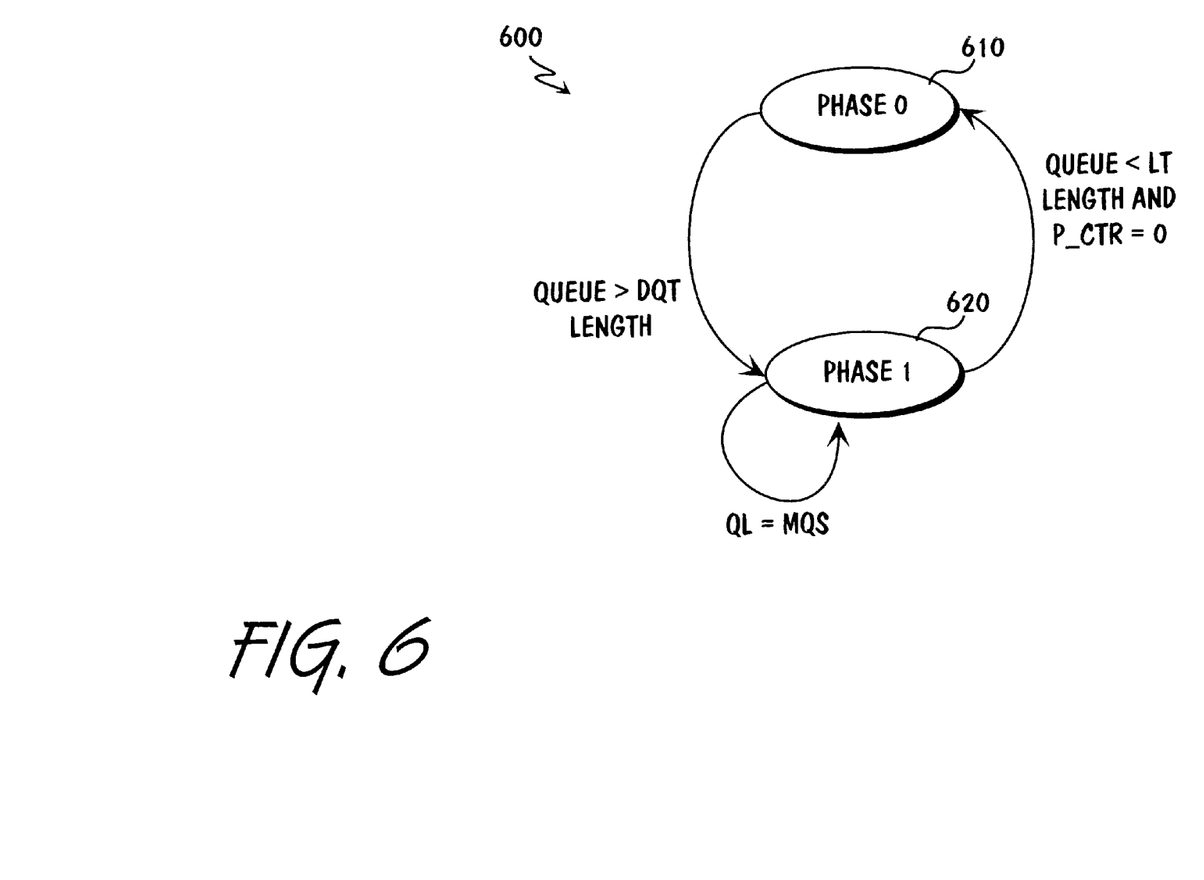
FIG. 6 is a state diagram of an embodiment of the present invention, in particular, a state diagram for the dynamic threshold algorithm implemented by decision block 430 in FIG. 4.

FIG. 6 provides a state diagram 600 for an algorithm implemented by packet discard decision block 430 in a second embodiment of the present invention. The accompanying pseudo-code describes the algorithm in more detail.

Variables:

ACR=current Available Cell Rate, i.e., current cell transmission rate.

CI=Congestion Indication in ATM network as determined from received RM cell.

Congestion Phase=a bit providing information on the phase of the congestion (set to 0 or 1).

ER=maximum ATM network allowed cell transmission rate as determined from a received RM cell, in particular, based on the value of the Explicit Rate bit therein; ER is the ceiling for ACR.

DQT=Dynamic Queue Threshold; DQT is sensitive to current ACR; When QL>DQT, it triggers TCP packet drop. LT<=DQT<=HT.

HT=High Queue Threshold (typically less than MQS). The maximum value for DQT.

LD_ACR=ACR when a packet was last dropped, or when ACR is increased greater than LD_ACR; then the new LD_ACR is weighted average of ACR and the previous value for LD_ACR.

LT=Low Queue Threshold; minimum number of packets in the queue, as a percentage of MQS, e.g., a range of 30 to 50 percent.

MQS=Maximum Queue Size, e.g., in terms of maximum number of packets in the queue.

P_CTR=the number of packets in the queue when a packet is dropped; P_CTR is decremented each time a packet is serviced, i.e., read from the queue.

QL=Queue Length in terms of number of packets in the queue.

α=gain factor for LD_ACR, wherein $0<=\alpha<=1$.

Initialize:
LD_ACR=ACR;
Congestion Phase=0;
Set values for HT, LT and MQS;
DQT=HT;

```
When receiving an RM cell {
    Update ACR value based on ER and CI information;
    DQT = Max{(ACR/LD_ACR) * HT, LT}
    }
if (Congestion Phase = 0) {
    if (QL => DQT){
        Drop TCP packet from front of Queue;
        Congestion Phase = 1;
        LD_ACR = ACR;
        P_CTR = QL;
    }
    if (ACR > LD_ACR) {
        LD_ACR = α * ACR + (1 - α) * LD_ACR;
    }
}
if (Congestion Phase = 1) {
    if (QL = MQS){
        Drop TCP packet in front of Queue;
        LD_ACR = ACR;
        P_CTR = QL;
    }
    if (QL < LT and P_CTR = 0){
        Congestion Phase = 0;
    }
    Decrement P_CTR when a TCP packet is serviced;
    P_CTR = Max (P_CTR, 0);
}
```

On receipt of RM cells with the feedback information, appropriate changes are made to the value of ACR for the particular VC. When the value of ACR is reduced and stays constant, the queue continues to receive TCP packets, and therefore, grow. This information is conveyed to the TCP source port at the Transport layer as soon as possible. The above pseudo-code defines an algorithm that uses the ACR feedback information and the current queue length information to decide if a TCP packet should be dropped from the queue associated with the particular VC. Every time a packet is dropped, the algorithm updates the LD_ACR (Last Dropped ACR) value equal to the current ACR value. The updated value of LD_ACR is used as the reference rate against which new values for ACR are compared. The new value of LD_ACR is made equal to a linear weighted sum of the old value of LD_ACR and the new value of ACR, for reasons explained below, so that the new value of LD_ACR is greater than the old value of LD_ACR and less than the value of ACR. that is, old LD_ACR<new LD_ACR<ACR.

The value of the Dynamic Queue Threshold (DQT) is also changed when the value of ACR changes. The value of DQT reflects the degree to which the values of ACR and LD_ACR differ and is directly dependent on the ratio of ACR to LD_ACR. Thus, if the ratio of ACR/LD_ACR is low, the value of DQT is also low, and if the ratio is high, the value of DQT is high as well. As indicated in the pseudo-code, the lower value of DQT triggers an earlier TCP packet drop. Thus, if the value of ACR is significantly reduced, the algorithm responds faster than if the ACR is marginally reduced, in which case, the algorithm allows more time before it responds. If the value of ACR is large, the value of DQT is closer to the value of the High Queue Threshold (HT). The value of DQT is always maintained greater than the value of the Low Queue Threshold (LT).

The dynamic threshold algorithm consists of two phases, as indicated in the state diagram 600 of FIG. 6. The criteria used to effect a packet drop is different in the two phases, termed phase 0 (at 610) and phase 1 (at 620) herein:

Phase 0

The network is not congested in this phase. In phase 0, the algorithm causes a TCP packet to be dropped when congestion is detected and transitions to phase 1. When the queue length exceeds the DQT value, the network is considered congested. Early detection of congestion occurs if there is a low DQT value, signifying a low ACR and/or large TCP window size relative to the value of LD_ACR. When ACR is low, the algorithm tends to cause a TCP packet to be dropped earlier than when ACR is high because QL more readily exceeds DQT.

In situations where the value of ACR becomes equal to or greater than the value of LD_ACR, the value of DQT is equal to the High Queue Threshold (HT). As TCP keeps increasing the sliding window size, eventually the TCP packet transmission rate exceeds the ACR, causing the queue length to exceed DQT. This, in turn, causes a TCP packet to be dropped, thereby signaling the TCP source port to reduce the TCP sliding window size. HT is set to a high value, such than when the value of ACR is high, a TCP packet is dropped only when the queue is almost full. Ideally, HT is set lower than the value of MQS such that when a TCP packet is dropped there is still room in the queue to avoid dropping multiple consecutive TCP packets as a result of a full queue.

The value of DQT is always set greater than the Low Queue Threshold (LT). When the queue length is small, there is no reason to drop a TCP packet even if the value of ACR is very low because there is adequate available buffers. The small queue length and small ACR value implies that the input rate to the queue must also be small. Thus, dropping a TCP packet in such a case is not advisable or necessary. Additionally, in TCP implementations providing for fast recovery schemes, duplicate TCP acknowledgements indicating successful transmission of TCP packets are required in order to trigger the recovery mechanism. In particular, three duplicate TCP acknowledgments are required. Thus, when a TCP packet is dropped to signal congestion and to reduce the TCP sliding window size, at least three TCP packets are successfully transmitted after the dropped TCP packet. Thus, the Low Queue Threshold should be set to at least five packets. When the buffer size is large and large queue lengths can be accommodated, the LT value can be much larger.

A TCP packet is dropped from the front of the queue, resulting in early triggering of the congestion control mechanism in TCP (one buffer worth of data earlier). Additionally, the TCP sliding window flow control mechanism aligns the start of the sliding window with the dropped TCP packet and waits until that TCP packet is successfully retransmitted, thereby reducing the amount of data that the TCP source port pumps into a congested ATM network. In implementations of TCP providing for fast recovery and retransmission, a recovery from the dropped TCP packet is accomplished sooner than implementations not providing for fast recovery and retransmission because at least one buffer worth of data is transmitted after the dropped TCP packet (which in turn generates the required duplicate TCP acknowledgments for the fast retransmit or recovery).

Transition to Phase 1: when a TCP source port detects a dropped or lost TCP packet, depending on the implementation, the sliding window size is reduced to one packet, or half its current window size. When multiple packets are lost within the same TCP window, different TCP implementations will recover differently, as described above. The first TCP packet dropped causes a reduction in the TCP sliding window size and thereby the average TCP packet transmission rate. Multiple dropped TCP packets within the same TCP sliding window causes a degradation of throughput and is not desirable, irrespective of the TCP implementation. Thus, after the first TCP packet is dropped, the algorithm transitions to phase 1.

Phase 1

The network is considered to be congested, but the algorithm does not drop TCP packets to convey a reduction of the ACR rate to the Transport layer. Rather, the TCP packets are dropped only when the queue reaches the MQS value. The TCP packets are dropped from the front of the queue for the same reasons set forth above with respect to phase 0. Whenever a TCP packet is dropped, the algorithm records the number of packets in the queue in the variable P_CTR. The TCP sliding window size is at least equal to the value of P_CTR when a packet is dropped. Thus, the algorithm attempts to drop no more TCP packets due to rate reduction until a number of TCP packets, equal to the value of P_CTR, is serviced.

Transition to Phase 0: if the ACR stays at the value that caused the transition to phase 1, i.e., if congestion still exists, the queue length decreases after one round trip time and the algorithm transitions to phase 0. If the ACR decreases further, then queue length increases and the algorithm eventually drops another TCP packet if the queue length reaches the value of MQS, but does not transition back to phase 0. The transition to phase 0 takes place when at least a certain number of TCP packets, equal to the value of P_CTR, have been serviced and the queue length falls below the Low Queue Threshold.

The dynamic threshold algorithm has the following features not present in the static threshold algorithm:

Low Pass Filter for use in LD_ACR estimation: whenever ACR is increased, LD_ACR is set to a value that is a sum of a weighted sum of the previous value of LD_ACR and the new value of ACR, so that rapid fluctuations in the ACR value do not trigger the algorithm to drop a TCP packet. It is possible that due to conditions in the network, the ACR value can suddenly increase and then abruptly decrease. In the absence of the low pass filter mechanism, the algorithm drops a TCP packet even though there is effectively no change in the ACR. It should be noted that if the factor α is set to 1, the value of LD_ACR becomes equal to the ACR value, and there is no filtering of fluctuations in the ACR (as is the case in the static threshold algorithm discussed above).

Dynamic Threshold: irrespective of the ACR and the LD_ACR values, whenever the queue length exceeds the Dynamic Queue Threshold (DQT), a TCP packet is dropped from the front of the queue and Congestion Phase is set to 1. The DQT however, is a function of the ACR and the LD_ACR values, as well as the set parameter High Queue Threshold (HT). Dynamic threshold is sensitive to small changes in the ACR value, unlike the static threshold algorithm, where ACR changes by at least a factor (f) to trigger the algorithm. Depending on the ratio of ACR/LD_ACR, the DQT automatically gives more or less room for queue build up. When the ratio ACR/LD_ACR is small, the DQT value is also small and the packet drop is triggered earlier. When the ratio ACR/LD_ACR is high, the DQT value is set high and the algorithm allows more room for the queue to build up.

Use of HT<MQS: High Queue Threshold (HT) is a parameter that can be set close to the MQS value. HT defines the maximum value for DQT, irrespective of the values of ACR and LD_ACR. Thus, a TCP packet drop is triggered whenever the queue length exceeds HT and the Congestion Phase is set to 0. The value of HT is set less than the MQS value so that in cases where the value of ACR is marginally less than the value of LD_ACR, a TCP packet drop is still triggered before the queue length reaches the MQS value, thus providing room for the queue length to increase further before dropping packets again due to a full queue. It should be noted that if the value of HT is set equal to the value of MQS, the dynamic threshold algorithm operates in the same manner as the static threshold algorithm, except for the dynamic threshold itself.

The dynamic threshold algorithm follows the same logic and reasoning as the static threshold algorithm. Additionally, however, it provides the low pass filter for the LD_ACR estimation, a dynamic queue threshold, and the use of HT<MQS. The phase descriptions and the phase transitions in the dynamic threshold algorithm are the same as in the static threshold algorithm. The main concepts are the early detection of congestion, combination of the TCP flow control mechanism with the ATM ABR flow control mechanism, and action based on intelligent dropping of TCP packets from the front of the queue in response to changes in the value of ACR and queue length.

What is claimed is:

1. In a network device that interconnects a first data network and a second data network for communication of data therebetween, a method for communicating congestion detected at a Data Link layer protocol operating in the first data network to a Transport layer protocol operating in the second data network, comprising:
   a) receiving a Transport layer data packet from the second data network;
   b) storing the Transport layer data packet in a queue; and
   c) communicating the transition to a state of congestion to the Transport layer protocol operating in the second data network by discarding the Transport layer data packet from the queue if the Data Link layer protocol in the first data network detects a transition to a state of congestion.

2. The method of claim 1, wherein the first and second data networks are heterogeneous data networks.

3. The method of claim 2, wherein the first data network is a connection-oriented fixed length packet switched data network.

4. The method of claim 3, wherein the connection-oriented fixed-length packet switched data network is an Asynchronous Transfer Mode (ATM) network.

5. The method of claim 4, wherein the second data network is a connectionless-oriented, variable length packet data network.

6. The method of claim 5, wherein the connectionless-oriented, variable length packet data network operates according to a Transport Control Protocol/Internet Protocol (TCP/IP) protocol and the Transport layer data packets comprise TCP data packets.

7. The method of claim 6, wherein discarding the Transport layer data packet from the queue comprises discarding the TCP data packet from the queue if a Resource Management cell is received by the network device indicating a transition to a state of congestion in the ATM network and the queue contains a minimum number of TCP data packets a Resource Management cell is received by the network device indicating a maximum ATM cell transmission rate below a threshold and the queue contains a minimum number of TCP packets.

8. The method of claim 7, wherein the threshold is defined by a current ATM cell transmission rate.

9. The method of claim 7, wherein the threshold is defined by an ATM cell transmission rate when a TCP packet was last discarded.

10. The method of claim 7, wherein the oldest TCP packet is discarded from the queue.

11. The method of claim 1, further comprising discarding the data packet from the queue if the Data Link layer protocol in the first data network detects a continued state of congestion.

12. The method of claim 1, wherein discarding the Transport layer data packet from the queue further comprises discarding the Transport layer data packet from the queue if the queue is full.

13. The method of claim 1, further comprising:
   d) transmitting the data packet over the first data network in accordance with the protocol operating in the first data network, if the a state of congestion is not detected.

14. The method of claim 6, wherein discarding the Transport layer data packet from the queue comprises discarding the TCP data packet from the queue comprises discarding if a Resource Management cell is received by the network device indicating a maximum ATM cell transmission rate below a threshold and the queue contains a minimum number of TCP packets.

15. A method for communicating network congestion detected by a protocol corresponding to a first layer and operating in a first network to a protocol corresponding to a second layer and operating in a second network, comprising:
   a) receiving a data packet from the second network;
   b) storing the data packet in a queue; and
   c) communicating the transition to a state of network congestion in the first network to the protocol operating in the second network by discarding the data packet from the queue if the protocol corresponding to the first layer and operating in the first network detects a transition to a state of network congestion in the first network.

16. The method of claim 15, wherein discarding the data packet from the queue comprises discarding the data packet from the queue if an indication is received from the protocol corresponding to the first layer and operating in the first network that the first network has transitioned to a state of network congestion and the queue contains a minimum number of data packets.

17. The method of claim 15, further comprising discarding the data packet from the queue if the protocol corresponding to the first layer and operating in the first network detects a continued state of network congestion.

18. The method of claim 15, further comprising discarding the data packet from the queue if the queue is full.

19. The method of claim 16, wherein discarding the data packet from the queue comprises discarding the data packet from the queue if an indication is received from the protocol operating in the first network that the first network has transitioned to a reduced maximum data transmission rate and the queue contains a minimum number of data packets.

20. The method of claim 15, wherein the data packet includes a payload, and wherein the method further comprises transmitting the data packet payload over the first network in accordance with the protocol operating in the first network, if the a state of congestion is not detected.

21. A method for communicating network congestion detected by a protocol corresponding to a first layer and operating in a first network to a protocol corresponding to a second layer and operating in a second network, comprising:
   a) receiving a data packet from the second network;
   b) storing the data packet in a queue; and
   c) communicating the transition to a state of network congestion in the first network to the protocol operating in the second network by discarding the data packet from the queue if a length for the queue is greater than a dynamic queue threshold associated with the queue.

22. The method of claim 21, wherein the dynamic queue threshold is defined according to a ratio of a reduced maximum data transmission rate to which the first network has transitioned to a threshold.

23. The method of claim 22, wherein the threshold is defined by a current data transmission rate in the first network.

24. The method of claim 22, wherein the threshold is defined by a data transmission rate in the first network when a data packet was last discarded.

25. The method of claim 22, wherein the dynamic queue threshold is further defined by a product of the ratio of the reduced maximum data transmission rate to the threshold multiplied by a high queue threshold for the dynamic queue threshold.

26. The method of claim 23, wherein the dynamic queue threshold is further defined by a product of the ratio of the reduced maximum data transmission rate to the current data transmission rate in the first network multiplied by a high queue threshold for the dynamic queue threshold.

27. The method of claim 24, wherein the dynamic queue threshold is further defined by a product of the ratio of the reduced maximum data transmission rate to the data transmission rate in the first network when a data packet was last discarded multiplied by a high queue threshold for the dynamic queue threshold.

28. The method of claim 25, wherein the dynamic queue threshold is defined as the maximum of either the product of the ratio multiplied by the high queue threshold, or a low queue threshold.

29. The method of claim 28, wherein the low queue threshold is set to at least five data packets.

30. The method of claim 21, further comprising discarding the data packet from the queue if the protocol corresponding to the first layer and operating in the first network detects a continued state of network congestion.

31. The method of claim 21, wherein the dynamic queue threshold is defined as a weighted average of a current data transmission rate in the first network and a data transmission rate in the first network when a data packet was last discarded.

32. The method of claim 15, further comprising discarding the data packet from the queue if the queue is full.

33. The method of claim 15, wherein the data packet includes a payload, the method further comprising transmitting the data packet payload over the first network in accordance with the protocol operating in the first network, if a state of congestion is not detected.

34. A system to communicate congestion detected at a Data Link layer protocol in a first network to a Transport layer protocol in a second network, comprising:
   a) a first sub-system to receive a Transport layer data packet from the second network;
   b) a queue to store the Transport layer data packet; and
   c) a second sub-system to communicate the transition to a state of congestion to the Transport layer protocol in the second network by discarding the Transport layer data packet from the queue if the Data Link layer protocol in the first network detects a transition to a state of congestion.

35. The apparatus of claim 34, wherein the second sub-system to transmit the data packet over the first network in accordance with the protocol operating in the first network, if a state of congestion is not detected by the Data Link layer protocol in the first network.

36. A system to communicate congestion detected at a protocol corresponding to a first layer and operating in a first network to a protocol corresponding to a second layer and operating in a second network, comprising:
   a) a first sub-system to receive a packet from the second network;
   b) a queue to store the packet; and
   c) a second sub-system to communicate the transition to a state of congestion to the protocol operating in the second network by discarding the packet from the queue if the protocol corresponding to the first layer and operating in the first network detects a transition to a state of congestion in the first network.

37. The network device of claim 36, wherein the packet includes a payload; and wherein the second sub-system transmits the packet payload over the first network in accordance with the protocol corresponding to the first layer and operating in the first network, if a state of congestion is not detected.

38. The method of claim 36, wherein the second sub-system discards the packet from the queue if the protocol corresponding to the first layer and operating in the first network detects a continued state of congestion.

39. An apparatus for communicating congestion detected at a protocol corresponding to a first layer and operating in a first network to a protocol corresponding to a second layer and operating in a second network, comprising:
   a) means for receiving a packet from the second network;
   b) means for storing the packet; and
   c) means for communicating the transition to a state of congestion to the protocol operating in the second network by discarding the packet from the queue if the protocol corresponding to the first layer and operating in the first network detects a transition to a state of congestion.

40. The network device of claim 39, wherein the packet includes a payload, the network device further comprising means for transmitting the packet payload over the first network in accordance with the protocol corresponding to the first layer and operating in the first network, if a state congestion is not detected.

41. A machine-readable medium comprising at least one instruction for communicating congestion detected at a protocol corresponding to a first layer and operating in a first network to a protocol corresponding to a second layer and operating in a second network, which when executed by a processor, causes the processor to perform the following:

a) receive a packet from the second network;

b) store the packet in a queue; and c) communicate the transition to a state of congestion to the protocol operating in the second network by discarding the packet from the queue if the protocol corresponding to the first layer and operating in the first network detects a transition to a state of congestion.

42. The medium of claim 41, wherein the packet includes a payload, the machine readable medium further comprising at least one instruction, which when executed by the processor, causes the processor to transmit the packet payload over the first network in accordance with the protocol corresponding to the first layer and operating in the first network, if a state of congestion is not detected.

43. A signal embodied in a carrier wave for communicating congestion detected at a protocol corresponding to a first layer and operating in a first network to a protocol corresponding to a second layer and operating in a second network comprising:

a) a first code segment to receive a packet from the second network;

b) a second code segment to store the packet in a queue; and c) a third code segment to communicate the transition to a state of congestion to the protocol operating in the second network by discarding the packet from the queue if the protocol corresponding to the first layer operating in the first network detects a transition to a state of congestion.

44. The signal of claim 43, further comprising a fourth source code segment to transmit the packet payload over the first network if a state of congestion is not detected.

45. The signal of claim 43, further comprising:

d) a fifth code segment to discard the packet from the queue if the protocol corresponding to the first layer and operating in the first network detects a continued state of congestion.

* * * * *